(12) United States Patent
Desprez et al.

(10) Patent No.: US 8,061,690 B2
(45) Date of Patent: Nov. 22, 2011

(54) VARIABLE-FLEXIBILITY SPRING SUPPORT

(75) Inventors: Sebastien Desprez, Versailles (FR); Joel Szymanski, Les Clayes Sous Bois (FR)

(73) Assignee: Renault S.A.S., Boulogne Billancourt (FR)

( * ) Notice: Subject to any disclaimer, the term of this patent is extended or adjusted under 35 U.S.C. 154(b) by 719 days.

(21) Appl. No.: 12/096,385

(22) PCT Filed: Nov. 20, 2006

(86) PCT No.: PCT/FR2006/051197
§ 371 (c)(1),
(2), (4) Date: Jun. 6, 2008

(87) PCT Pub. No.: WO2007/068835
PCT Pub. Date: Jun. 21, 2007

(65) Prior Publication Data
US 2008/0290572 A1    Nov. 27, 2008

(30) Foreign Application Priority Data

Dec. 14, 2005  (FR) ..................................... 05 53875

(51) Int. Cl.
*B60G 13/00* (2006.01)

(52) U.S. Cl. ............................ 267/33; 267/152; 267/202
(58) Field of Classification Search .......... 267/150–153, 267/170, 174–179, 201–209, 220, 33; 280/124.164, 280/124.165, 124.177
See application file for complete search history.

(56) References Cited

U.S. PATENT DOCUMENTS

| | | | |
|---|---|---|---|
| 5,871,198 A * | 2/1999 | Bostrom et al. | 248/588 |
| 6,254,072 B1 * | 7/2001 | Bono et al. | 267/220 |
| 7,270,320 B2 * | 9/2007 | Menzel et al. | 267/175 |
| 2002/0158385 A1 | 10/2002 | Schleinitz et al. | |
| 2008/0174060 A1 * | 7/2008 | Pare et al. | 267/220 |

FOREIGN PATENT DOCUMENTS

| | | |
|---|---|---|
| EP | 0 778 166 | 6/1997 |
| FR | 2 799 693 | 4/2001 |

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

A support element for a motor vehicle suspension spring, including a main part and a substantially rigid or semi-rigid insert. The suspension spring bears directly on the substantially rigid or semi-rigid insert.

10 Claims, 4 Drawing Sheets

VARIABLE-FLEXIBILITY SPRING SUPPORT

BACKGROUND

The present invention relates to the field of motor vehicle suspensions and, more particularly, to variable-stiffness suspensions.

This type of suspension is, specifically, increasingly widespread in response to needs of comfort of vehicles. The most frequently used solutions to obtain a variable stiffness consist in producing a spring suspension assembly in which the spring is a wire spring of variable section, the spring resting on an element made of elastomer: the stiffness is thus minimal while the smaller diameter coils of the spring are not in contact with the elastomer support element, then increases with the length of the coil in contact with the support element. In order to provide a good hold of the spring, the latter may be clipped to the elastomer support element; such a solution also allows a nonaggressive contact with the spring.

The production of a variable-section spring is however relatively costly, and other solutions have been envisaged for producing a variable stiffness of the assembly, in particular the use of a variable-flexibility support element which then makes it possible to use a wire spring of constant section (see for example, and in a nonexhaustive manner, document EP0924445).

A first embodiment of a variable-flexibility support element consists, for example, in forming a set of notches on the surface of the support element, made of an elastomer, in contact with the spring: at rest, the stiffness in compression is minimal; in the compression phase, the notches deform and the stiffness increases. This solution is however not entirely satisfactory: in particular, it has poor resistance to grit, the grit building up between the notches and being able to damage the spring. In addition, it does not cover the needs of rapid increase of stiffness, and its endurance behavior is limited, because of the alternating actions to which the elastomer forming the support element is subjected.

A second embodiment of a variable-flexibility support element consists in placing, within the elastomer support element, a rigid insert, for example made of aluminum or plastic. The insert may, like the surface in contact with the spring, comprise notches, which makes it possible to obtain a greater maximal stiffness while increasing endurance behavior. A risk of performance deterioration over time however remains, because of the creep of the elastomer forming the support element.

BRIEF SUMMARY

The object of the present invention is to propose a variable-flexibility suspension spring support element that does not have the aforementioned disadvantages and that is simple and cheap to produce.

The invention achieves its objective thanks to a support element for a suspension spring of a motor vehicle, consisting of a main portion and a substantially rigid or semi-rigid insert, characterized in that the suspension spring is resting directly on the substantially rigid or semi-rigid insert.

Advantageously, the insert also plays the role of centering the spring on the support element according to the invention.

In a first embodiment, the main portion of the support element comprises a substantially conical pedestal recessed in the vicinity of its axis of revolution, from which extends, substantially coaxially, a second conical portion of smaller diameter than the pedestal, also recessed in the vicinity of its axis of revolution, and the invention has one or more of the following features:

the main portion comprises a saturation lip with a diameter that is substantially larger than the diameter of its base, the saturation lip is placed on the pedestal of the main portion, opposite to the second conical portion, the insert has a shape that is substantially similar to that of the main portion and substantially caps, during assembly, the second conical portion of the latter, the base of the insert forms, once the insert is nested on the pedestal of the main portion of the support element according to the invention, a flanged saturation edge designed to improve endurance behavior of the support element, opposite to the base of the insert, the second conical portion of the latter comprises, in the vicinity of its smaller diameter portion, a lip with a diameter larger than the smallest diameter of the second conical portion, the spring is inserted between the upper face of the base of the insert and the lower face of the lip placed on the second conical portion of the insert; it is held in its housing by clipping by means of appropriate tabs, the diameter of the flanged saturation edge of the insert is substantially equal to the diameter of the saturation lip formed at the base of the pedestal of the main portion of the support element according to the invention, the main portion is made of an elastomer, for example rubber, the insert is made of a rigid plastic, for example polyurethane.

In a second embodiment, the insert is semi-rigid, comprises no flanged saturation edge, and is furnished, on the lower face of its base, with a set of male ribs designed to be engaged in a set of matching female ribs made on the upper face of the pedestal of the main portion of the support element according to the invention.

BRIEF DESCRIPTION OF THE DRAWINGS

Other features and advantages will emerge on reading the following description, with reference to the appended figures in which.

DETAILED DESCRIPTION

Figure 1:
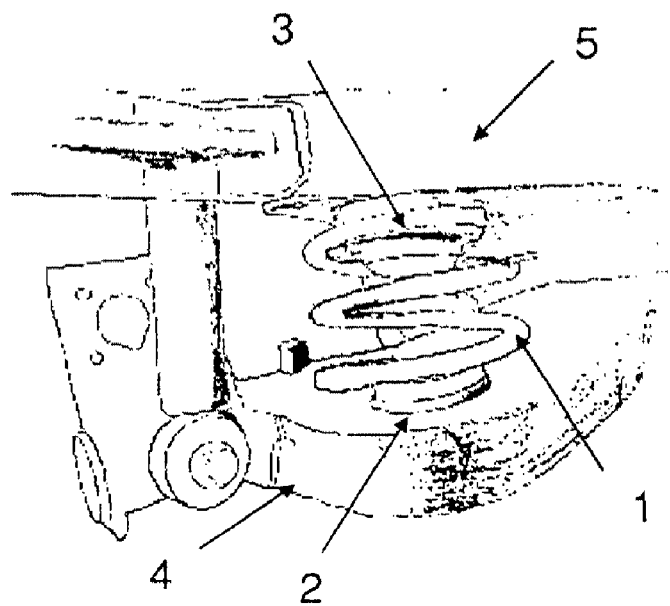
FIG. 1 is a schematic overview, in perspective, of a suspension spring and of the main elements of its environment.

A spring suspension assembly as conventionally known in the prior art, schematically represented in FIG. 1, comprises a suspension spring 1 each of whose ends is in contact respectively with a lower support element 2 and an upper support element 3, the lower support 2 and upper support 3 being connected, by appropriate means (not shown in FIG. 1), respectively to the undercarriage 4 and the bodywork 5 of the vehicle. According to known embodiments in the prior art, the support elements 2 and 3 each comprise a portion playing the role of centering and allowing a fixed and reproducible positioning of the suspension spring 1 relative to the undercarriage 4 and the bodywork 5. According to an embodiment also known in the prior art for producing a variable-stiffness suspension, when the suspension spring 1 is a wire spring of constant section, the upper support 3, connected to the bodywork 5 of the vehicle, has a variable flexibility.

An upper support element 3 according to the invention comprises a main portion 6 and an insert 7, that is rigid or semi-rigid, in direct contact with which the suspension spring 1 comes to be placed.

As shown in FIGS. 2 to 5, the main portion 6 is formed of a pedestal 8 and an appendage 9, that are substantially frustoconical, coaxial with the axis of revolution Z, the largest diameter of the appendage 9 being substantially smaller than the smallest diameter of the pedestal 8. When the suspension assembly is mounted on the vehicle, the larger diameter lower face 10 of the pedestal 8 is in contact with the bodywork 5, and the appendage 9 then extends, from its largest to its smallest diameter, from the upper face 11 of the pedestal 8. For the purpose of making it lighter and simpler to produce, an axial recess is made in the pedestal 8 and in the appendage 9. Advantageously, the main portion 6 is made of relatively rigid plastic such as polyurethane.

In a first embodiment of the invention, more specifically shown by FIGS. 2, 3A and 3B, the diameter of the lower face 10 of the pedestal 8 is substantially enlarged and forms a lip 12, or saturation lip, whose role will be specified later.

According to this embodiment, the insert 7 of the support element 3 has a shape that is substantially similar to the shape of the main portion 6 of the support element 3. The insert 7 therefore consists of a base 13 and an appendage 14. The base 13 and the appendage 14 are substantially frustoconical and coaxial, and the appendage 14 extends, from its largest to its smallest diameter, from the smaller diameter upper face 15 of the base 13. The insert 7 also comprises an axial recess, whose internal shape and dimensions match the external shape and dimensions of the appendage 9 of the main portion 6. The largest diameter of the base 13 of the insert 7 is substantially larger than the smallest diameter of the pedestal 8 of the main portion 6 of the support element 3 according to the invention, and the lower portion of the base 13 also comprises a flat 16, whose shape and dimensions match the shape and dimensions of the upper portion of the pedestal 8 of the main portion 6 of the support element 3. The smaller diameter upper face 17 of the appendage 14 of the insert 7 also comprises a larger diameter lip 18 whose role will be specified later.

For this embodiment of the invention, the insert 7 of the support element 3 according to the invention is made of a plastic that is more rigid than the material used to produce the main portion 6 of the support element 3 according to the invention.

Figure 2:
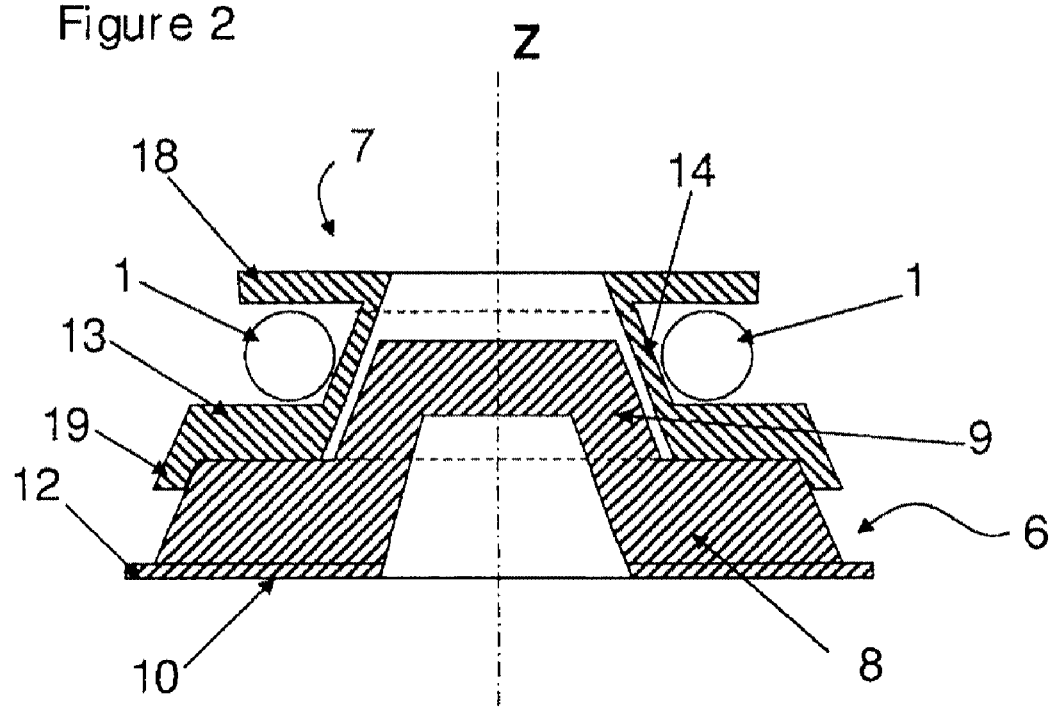
FIG. 2 is a schematic view in section, along a plane of symmetry, of a first embodiment of a support element according to the invention.
Figure 3A:
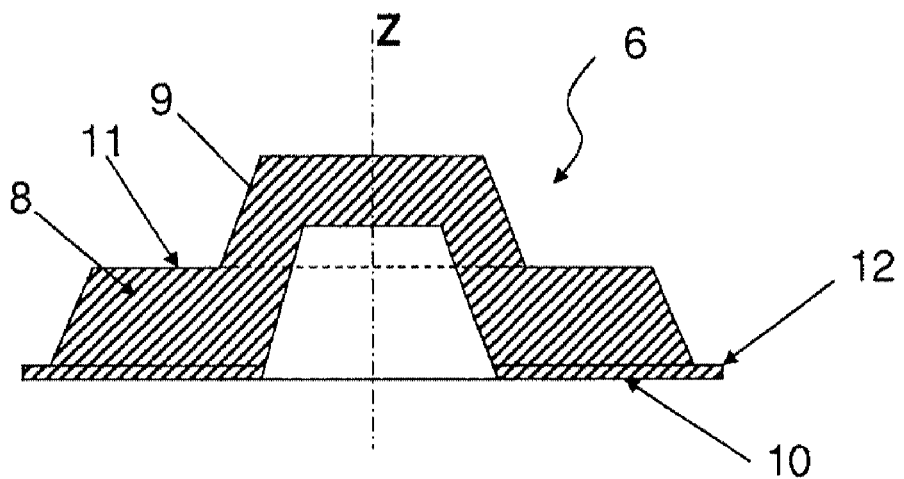
FIGS. 3A and 3B are schematic views in section, along a plane of symmetry, of a first embodiment of the main components of a support element according to the invention.
Figure 3B:
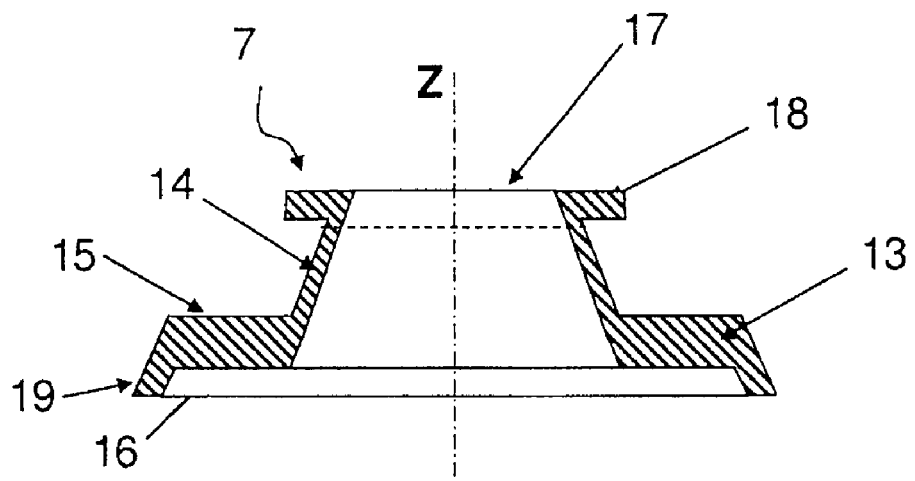

When the main portion 6 and insert 7 are assembled to form the support element 3 according to the invention, and as shown in FIG. 2, the insert 7 is, thanks to the flat 16 arranged in its lower portion, placed on the upper portion of the pedestal 8 of the main portion 6. The insert 7 is therefore nested on the main portion 6 of the support element 3 according to the invention, and the lower edge 19, or saturation edge, of the base 13 of the insert 7 covers the upper edge of the pedestal 8 of the main portion 6. The suspension spring 1 is placed around the appendage 14 of the insert 7, between the upper face of the base 13 and the lower face of the lip 18, the appendage 14 also playing the role of centering the spring 1 and allowing it to be positioned reproducibly, and the lip 18 playing the role of a stop preventing the spring 1 from coming out of its housing thus defined.

Figure 4:
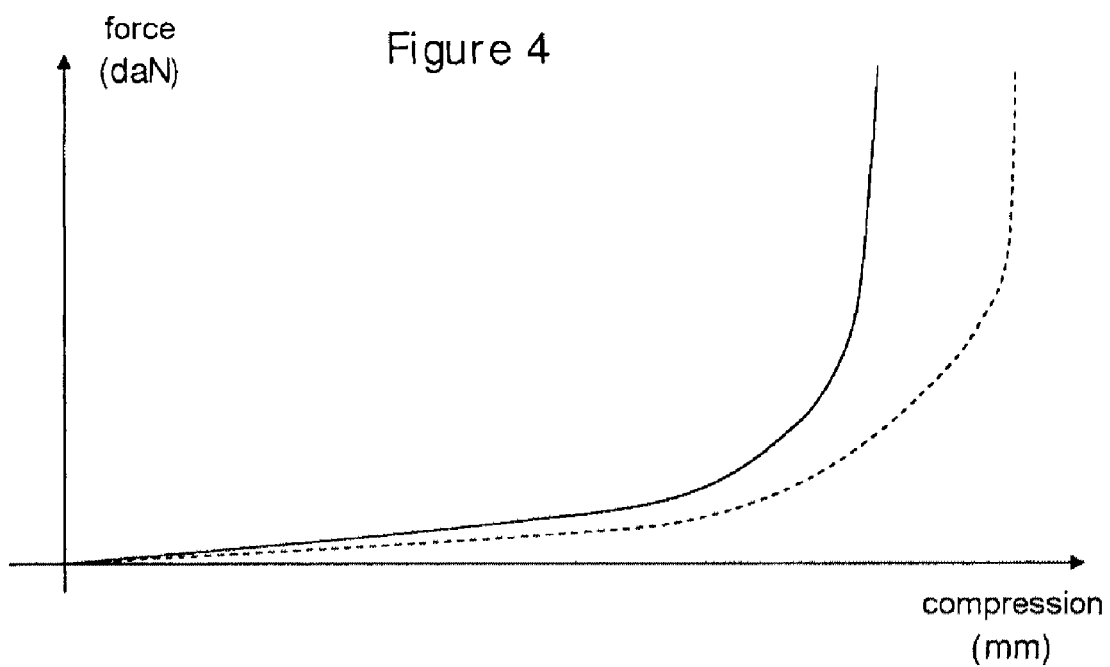
FIG. 4 is a characteristic curve of the suspension spring support, for a conventional suspension device and for the first embodiment of the invention.

Such an arrangement makes it possible to greatly limit or even eliminate the build-up of grit between the suspension spring 1 and its support, thereby reducing the risks of the spring 1 being damaged by grit. Furthermore, when the spring is compressed, the presence and the configuration of the saturation edge 19 make it possible to modify the stiffness of the support, in particular in saturation, that is to say when the spring is completely compressed, as shown in FIG. 4. On this plot of the stiffness of the support of a suspension spring 1 according to its compression, the dashed-line curve represents the case of a support element 3 comprising no saturation edge 19 as configured in the first embodiment of the invention, and the solid-line curve represents the case in which the spring 1 rests on an element 3 comprising a saturation edge 19 as configured in the first embodiment of the invention. It is clear that the increase in stiffness is more rapid in the latter case. The presence of such a saturation edge 19 also makes it possible to improve the endurance behavior of the material providing the flexible portion of the characteristic curve of the support (that is to say, in this instance, the material forming the main portion 6 of the support element 3 according to the invention).

The saturation lip 12 of the lower face 10 of the main portion 6 then makes it possible to eliminate the problems of noisiness associated with the sudden contact of the saturation edge 19 with the bodywork 5 of the vehicle. Preferably, but not exclusively, this saturation lip 12 will be made of an elastomer such as rubber; however, when the main portion 6 is made of a material other than elastomer (for example, and in a nonlimiting manner, when it is made of polyurethane), the saturation lip 12 will preferably be obtained by means of an elastomer shim (for example rubber) of appropriate dimensions, placed between the lower face 10 of the pedestal 8 of the main portion 6 and the bodywork 5 of the vehicle.

It should be noted that, to increase the diversity of the diameters of wire forming the suspension spring 1, the insert 7 may also be bi-material whereof one component is flexible and the other rigid.

Figure 5:
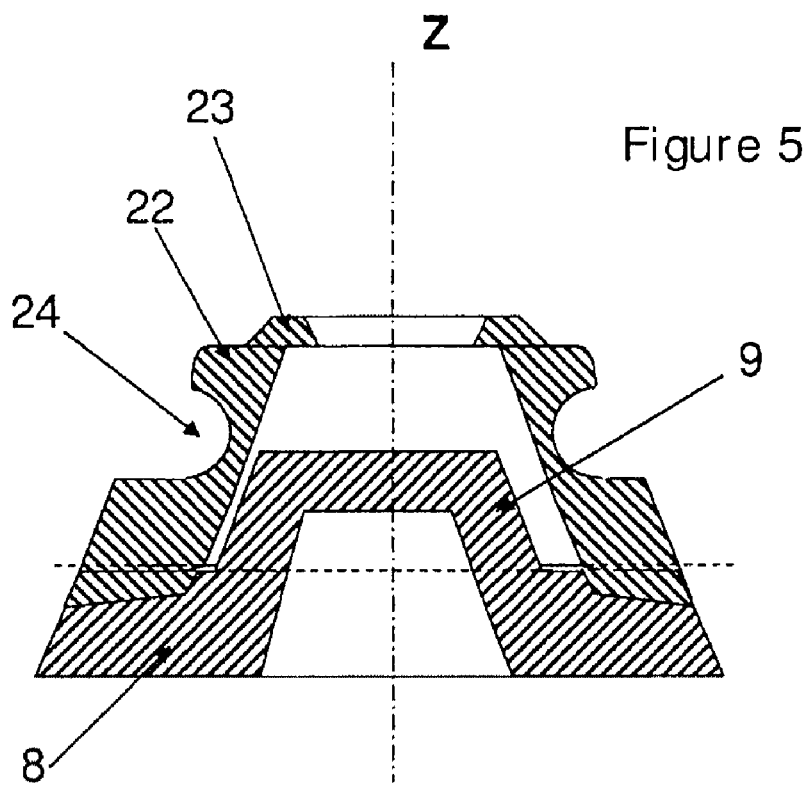
FIG. 5 is a schematic view in section, along a plane of symmetry, of a support element according to a second embodiment of the invention.
Figure 6A:
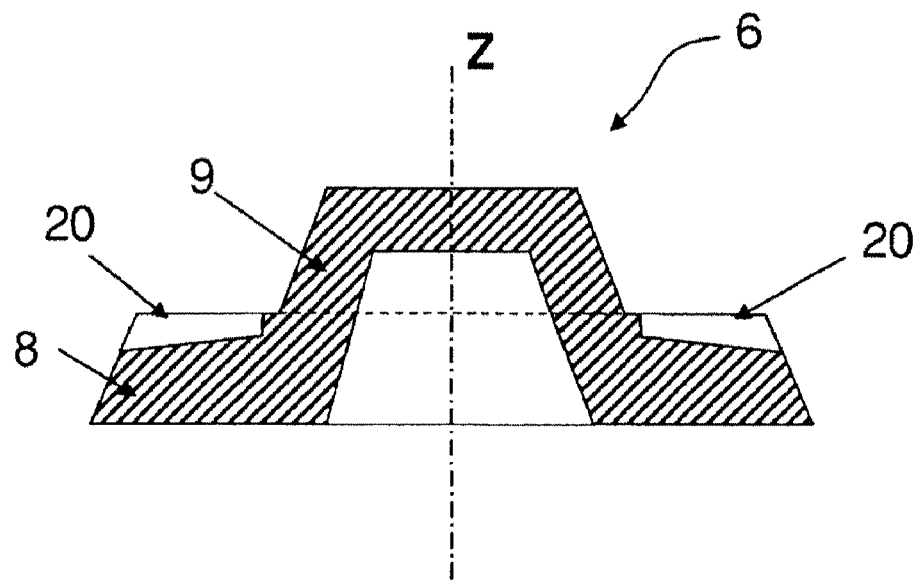
FIGS. 6A and 6B are schematic views in section, along a plane of symmetry, of the main components of a support element according to a second embodiment of the invention.
Figure 6B:
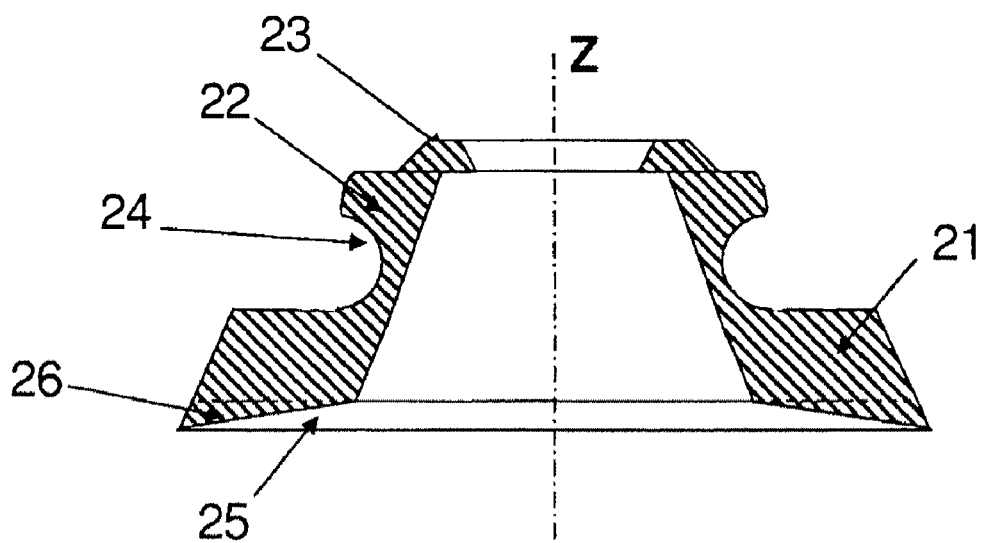

FIGS. 5, 6A and 6B show a second embodiment of the invention in which the insert 7 of the support element 3 is semi-rigid, preferably, but not exclusively, made of an elastomer such as rubber. In this embodiment, the main portion 6 of the support element 3 shown in FIG. 6A is similar to the main portion 6 as described in the first embodiment of the invention, but the lower face 10 of its pedestal 8 does not comprise a saturation lip 12. In addition, female ribs 20, substantially radial and evenly distributed, are arranged on the upper face 11 of its pedestal 8: the role of the ribs 20 will be explained later. In alternate embodiments, ribs 20 are replaced by one or more concentric appropriately shaped grooves.

In this embodiment, and as shown in FIG. 6B, the insert 7 is formed of a base 21 that is substantially frustoconical from the smaller diameter face from which extends, coaxially, a substantially frustoconical appendage 22 whose upper portion is furnished with a substantially hemispherical cap 23. The largest diameter of the base 21 is substantially equal to the diameter of the upper face 11 of the pedestal 8 of the main portion 6, so that, once the main portion 6 and the insert 7 are assembled to form the support element 3 according to the invention, the base 21 of the insert 7 does not cover the upper edge of the pedestal 8 of the main portion 6, but is flush with its periphery.

The insert 7 comprises, over its whole height, and as has been described above for the first embodiment of the invention, an axial recess whose shape and dimensions match the shape and dimensions of the outer surface of the appendage 9 of the main portion 6.

A substantially cylindrical groove 24 is also arranged on the periphery of the substantially frustoconical appendage 22: the dimensions of the groove 24 are defined according to the section of the wire forming the suspension spring 1. The suspension spring 1 is installed and then clipped into the groove 24, which allows a large diversity of wire sections for the suspension spring 1. This solution also greatly reduces the friction of the spring against the insert 7 of the support element 3, and therefore greatly limits the abrasion at the interface with the spring 1.

Furthermore, the lower face of the base 21 of the insert 7 comprises a flat 25 in which is formed an assembly of male ribs 26 that are substantially radial, whose shapes, dimensions and distribution match the shapes, dimensions and distribution of the female ribs 20 of the upper face 11 of the pedestal 8 of the main portion 6. In alternate embodiments, in which the ribs 20 are replaced by concentric grooves, the male ribs 26 form, on the lower face of the base 21, a set of lips capable of interacting with grooves.

When the main portion 6 and the insert 7 are assembled to form the support element 3 according to the second embodiment of the invention, the insert 7 is nested on the appendage 9 of the main portion 6, the male ribs 25 of the insert 7 being engaged with the female ribs 20 described above of the main portion 6, thereby allowing the two portions of the support element 3 to be locked by one another. The main portion 6 then performs the active function of the support, and the ribs 20 and 26 also make it possible to adjust the stiffness of the assembly. The edge of the flat 25 in this instance forms a saturation bowl when, the spring being in maximum compression, the insert 7 is compressed against the main portion 6 of the support element 3.

Therefore, the invention makes it possible to produce a variable-stiffness support for a suspension spring 1 having both a good resistance to grit build-up and a prolonged endurance. The two embodiments have been presented as an example, and it will therefore be understood that, without departing from the context of the invention, it is possible for the insert presented in the first embodiment not to have a saturation edge 19.

The invention claimed is:

1. A support element for a suspension spring of a motor vehicle, comprising:
   a main portion formed of a pedestal that is substantially frustoconical and includes an upper face from which extends coaxially a substantially frustoconical appendage whose largest diameter is smaller than a smallest diameter of the pedestal; and
   a substantially rigid or semi-rigid insert formed of a base that is substantially frustoconical and includes an upper face from which extends coaxially an appendage whose largest diameter is smaller than a smallest diameter of the base, the insert further comprising an axial recess whose shape and internal dimensions match a shape and external dimensions of the appendage of the main portion,
   wherein the suspension spring rests directly on the substantially rigid or semi-rigid insert.

2. The support element as claimed in claim 1, wherein the appendage of the insert is substantially frustoconical the insert further comprising a flat being arranged in a lower portion of the base of the insert.

3. The support element as claimed in claim 2, wherein the main portion and the insert are assembled by nesting the upper face of the pedestal of the main portion in the flat, the lower portion of the base of the insert then completely covering the upper face of the pedestal of the main portion and forming a saturation edge around the upper face of the pedestal of the main portion.

4. The support element as claimed in claim 3, further comprising a saturation lip, whose diameter is substantially larger than a diameter of a lower face of the pedestal of the main portion, that extends around the lower face.

5. The support element as claimed in claim 1, wherein the appendage of the insert is substantially frustoconical and an upper portion of the appendage of the insert includes a substantially hemispherical cap.

6. The support element as claimed in claim 5, wherein a diameter of the base is substantially equal to a diameter of the upper face of the pedestal of the main portion.

7. The support element as claimed in claim 5, further comprising a substantially cylindrical groove arranged on a periphery of the substantially frustoconical appendage of the insert and configured to receive the suspension spring.

8. The support element as claimed in claim 1, wherein an upper portion of the appendage of the insert comprises a lip of substantially larger diameter than a smallest diameter of the appendage.

9. A suspension device of a motor vehicle, comprising:
   a support element including
      a main portion formed of a pedestal that is substantially frustoconical and includes an upper face from which extends coaxially a substantially frustoconical appendage whose largest diameter is smaller than a smallest diameter of the pedestal, and
      a substantially rigid or semi-rigid insert formed of a base that is substantially frustoconical and includes an upper face from which extends coaxially an appendage whose largest diameter is smaller than a smallest diameter of the base, the insert further comprising an axial recess whose shape and internal dimensions match a shape and external dimensions of the appendage of the main portion; and
   a suspension spring placed around the appendage of the insert.

10. The suspension device as claimed in claim 9, wherein an upper portion of the appendage of the insert comprises a lip of substantially larger diameter than a smallest diameter of the appendage of the insert, and
   the suspension spring is disposed the between the upper face of the base of the insert and a lower face of the lip of the insert.

* * * * *